3,157,666
α-PHENYL-α-(2-PYRIDYL)-ARYLONES
Horace A. De Wald, Roger D. Westland, and John R.
Dice, Ann Arbor, Mich., assignors to Parke, Davis &
Company, Detroit, Mich., a corporation of Michigan
No Drawing. Filed Mar. 11, 1963, Ser. No. 264,080
9 Claims. (Cl. 260—297)

The present invention relates to ketone compounds. More particularly, it relates to α-phenyl-α-(2-pyridyl) substituted acetophenone compounds which can be represented in free base form by the formula

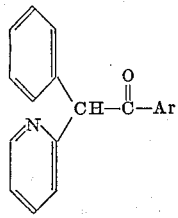

and to methods for their production; where Ar represents o-methylphenyl, o-ethylphenyl, o-isopropylphenyl, o-chlorophenyl, o-bromophenyl, o-fluorophenyl, o-methoxyphenyl, o-methylthiophenyl, o-trifluoromethylphenyl, 1-naphthyl, 2,3-dichlorophenyl, 2,4-dichlorophenyl, 2,6-dichlorophenyl, 2,4-dimethylphenyl or 2,6-dimethylphenyl.

Although in the foregoing general formula the compounds of the invention are represented as having a ketone structure, this is only one of the equivalent tautomeric forms in which these compounds can exist. The facile interconversion between the ketone form and other tautomeric forms is illustrated by the following equation.

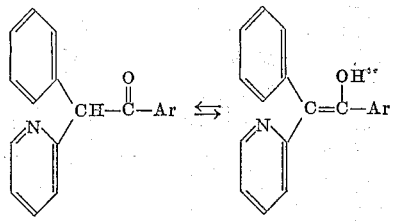

cis and trans isomers

In any particular compound of the invention, one of the indicated tautomeric forms, that is the ketone, the cis enol or the trans enol, may be favored by such factors as acidic or basic conditions or solvent. For reasons of convenience, the compounds of the invention are consistently formulated and named as having the ketone structure but because of the equilibrium state which can exist among the tautomeric forms, it will be appreciated that the ketone structure includes the tautomers as well.

In accordance with the invention, compounds of the foregoing formula are produced by reacting a compound which can be represented by the formula

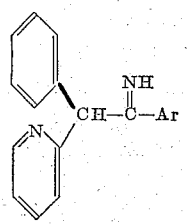

with a strong acid or a strong base in a hydroxylic medium; where Ar is as defined before. The terms "strong acid" and "strong base" are used in a relative sense and mean an acid or a base of sufficient strength to convert the imine group to a ketone group under feasible reaction conditions. The preferred reagents for carrying out this process are dilute or concentrated mineral acids such as hydrochloric acid, sulfuric acid and phosphoric acid. However, other relatively strong acids such as trifluoroacetic acid, benzenesulfonic acid, p-toluenesulfonic acid, formic acid and acetic acid, as well as relatively strong bases such as alkali metal and alkaline earth metal hydroxides, oxides and carbonates can also be used. The preferred hydroxylic medium is water or a mixture of water with another solvent such as an alkanol, ether, or dimethylformamide. Other hydroxylic media such as lower alkanols or mixtures of lower alkanols with various solvents can be used. The acidic or basic reagent is preferably employed in excess of the calculated amount and the presence of a substantial excess facilitates the reaction. The substance being reacted with the acidic or basic reagent, although for convenience represented in the foregoing formula as having an imine structure, can also exist in equivalent tautomeric forms, the cis enamine and the trans enamine. In the process described, the starting material can, of course, be used as an equivalent tautomeric form. The reaction proceeds at a satisfactory rate under moderate reaction conditions, and typically is carried out at a temperature from 0–100° C. with an acidic reagent and from 0–50° C. with a basic reagent, for from 5 minutes to 24 hours. For example, using mineral acid the reaction is normally substantially complete within 24 hours at room temperature or within a few minutes at 100° C., whereas with somewhat weaker organic acids a higher temperature or longer reaction time is used. Depending upon specific conditions, the reaction product is formed initially in either free base or salt form and is isolated in either free base or salt form following pH adjustment as required.

The imine compounds employed as starting materials in the foregoing process can be prepared by reacting a benzonitrile compound of the formula

Ar—CN with a reactive metal derivative such as the lithium derivative of 2-benzylpyridine under anhydrous conditions, followed by mild hydrolysis of the reaction mixture, as with water or ammonium chloride solution; where Ar is as defined before. The imine compounds employed as starting materials can be produced in situ and used without isolation if desired.

Also in accordance with the invention, compounds of the formula

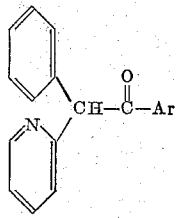

are produced by reacting a compound of the formula

Ar—CO—Z with a reactive metal derivative of 2-benzylpyridine under anhydrous conditions, followed by hydrolysis of the resulting reaction product; where Ar is as defined before and Z represents a hydrocarbonoxy group or halogen. Some examples of suitable reactive metal derivatives of 2-benzylpyridine are the lithium, sodium, potassium, calcium, and magnesium halide derivatives. The preferred reactive metal derivatives are the alkali metal derivatives which can be prepared by reacting 2-benzylpyridine with such reagents as phenyllithium, butyllithium, lithium piperidide, sodium diisopropylamide, or potassium diisopropylamide. The magnesium halide derivatives can be prepared by reacting an alkali metal derivative with a magnesium halide. Of the preferred alkali metal derivatives, the lithium derivative is the most suitable. When Z is a hydrocarbonoxy group, the starting material in which it appears is an ester. The hydrocarbonoxy group is preferably lower alkoxy. When Z is a halogen, the starting material in which it appears is an acid halide. The preferred halogen is chlorine. The first phase of the process is carried out by reacting the compound

Ar—CO—Z with a reactive metal derivative, preferably an alkali metal derivative, of 2-benzylpyridine in a non-hydroxylic solvent. The starting materials are normally employed in approximately equimolar quantities although if desired an axcess of either can be used. Some examples of suitable non-hydroxylic solvents are ether, ether-hydrocarbon mixtures, tetrahydrofuran, and diethylene glycol dimethyl ether. If desired, the reactive metal derivative of 2-benzylpyridine can be formed directly in the reaction mixture and used without isolation. Depending on the particular reactants used, the reaction of the ester or acid halide with the reactive metal derivative of 2-benzylpyridine is carried out at temperatures between −80° and 100° C. or the reflux temperature of the solvent, lower temperatures being preferred when the reactive metal derivative is a magnesium halide derivative and temperatures above room temperature being preferred in other cases. The time required for substantial completion of the reaction varies between about one hour and four days. When using the lithium derivative of 2-benzylpyridine and a compound in which Z represents methoxy, in refluxing ether, a reaction time of 12 hours is adequate. The desired product is then obtained following hydrolysis of the reaction mixture with water or other aqueous medium. The product is isolated in either free base or salt form following pH adjustment as required.

The compounds of the invention are preferably produced and used in the forms of their free bases. However, they are also capable of forming salts with acids and bases and can be produced and used in such salt forms if desired. The salt forming capabilities of the free bases of the invention vary because of such factors as hydrogen bonding and possibilities for internal salt formation. The free bases of the invention form acid-addition salts by reaction with relatively strong acids, preferably under anhydrous conditions. However, the ability to form acid-addition salts is limited and in some cases the free base itself separates from a moderately acidic medium. The free bases of the invention also form salts with strong bases such as sodium hydroxide and potassium hydroxide, these salts being salts of the enolic forms. The foregoing salts with acids and bases tend to revert to the free bases except when maintained under quite strongly acidic or alkaline conditions but in other respects they are equivalent to the free bases for the purposes of the invention.

The compounds of the invention have useful pharmacological and particularly hormonal properties. They are ovulation inhibitors and consequently are of value as anti-fertility agents. In addition, they are hypocholesteremic agents and cause a decrease in blood cholesterol. They are active upon oral administration but can also be given by the parenteral route if desired.

The invention is illustrated by the following examples.

*Example 1*

A solution of 5 g. of 2-[α-(o-methylbenzimidoyl)-benzyl]pyridine in 500 ml. of 0.1 N hydrochloric acid is maintained at 37° C. for 24 hours. The α-phenyl-α-(2-pyridyl)-2-methylacetophenone which separates is collected on a filter, washed with water and dried; M.P. 145–147° C.

By the foregoing general procedure, the product obtained from 2-[α-(o-ethylbenzimidoyl)benzyl]pyridine is α-phenyl-α-(2-pyridyl)-2-ethylacetophenone; M.P. 118–121° C.

A solution is prepared by dissolving 4.4 g. of α-phenyl-α-(2-pyridyl)-2-methylacetophenone in 25 ml. of warm 6 N sulfuric acid. The solution is allowed to cool slowly and the sulfate salt which separates is collected on a filter; M.P. 179–181° C. following crystallization from methanol-ether.

The starting materials are obtained as follows. A solution of phenyllithium is prepared by adding a solution of 187 g. of bromobenzene in 500 ml. of anhydrous ether with vigorous stirring to 17 g. of lithium chips in 500 ml. of anhydrous ether. The mixture is maintained under reflux by regulating the rate of addition and is stirred for 30 minutes after the addition is complete. With continued stirring, a solution of 210 g. of 2-benzylpyridine in 500 ml. of anhydrous ether is added to the solution of phenyllithium at such a rate that the ether is maintained at reflux. The reaction mixture which now contains the lithium derivative of 2-benzylpyridine is stirred for one more hour and then a solution of 117 g. of o-methylbenzonitrile in 200 ml. of anhydrous ether is added. The mixture is heated under reflux for 12 hours, chilled, and stirred with 300 ml. of saturated aqueous ammonium chloride solution. The ether layer is separated, dried over anhydrous magnesium sulfate, and concentrated to give an oily residue of 2-[α-(o-methylbenzimidoyl)benzyl]pyridine; B.P. 180–190° C. at 0.3 to 0.5 mm. For further purification, the compound can be crystallized from methanol; M.P. 76–80° C. By the same general procedure, using 12.5 g. of phenyllithium and 22 g. of 2-benzylpyridine, and with the substitution of 15.7 g. of o-ethylbenzonitrile for the o-methylbenzonitrile, the product obtained is 2-[α-(o-ethylbenzimidoyl)benzyl]pyridine; M.P. 98–100° C. after crystallization from methanol.

*Example 2*

A solution of 21.7 g. of 2-[α-(o-chlorobenzimidoyl)-benzyl]pyridine in 150 ml. of 85% phosphoric acid is maintained at 25° C. for 20 hours and then poured with stirring into 2 liters of ice water. The insoluble α-phenyl-α-(2-pyridyl)-2-chloroacetophenone which separates is collected on a filter, washed with water and dried; M.P. 135–137° C.

By the foregoing procedure, with the substitution of the same quantity of 2-[α-(o-bromobenzimidoyl)benzyl]-pyridine for the 2-[α-(o-chlorobenzimidoyl)benzyl]pyridine, the product obtained is α-phenyl-α-(2-pyridyl)-2-bromoacetophenone; M.P. 141–142.5° C.

The starting materials are obtained as follows. 23 g. of 2-benzylpyridine is added to a solution of phenyllithium (prepared from 2.1 g. of lithium and 23 g. of bromobenzene in 100 ml. of ether) and the mixture is heated under reflux for one-half hour. A solution of 16.5 g. of o-chlorobenzonitrile in 100 ml. of ether is added and the mixture is heated under reflux for three more hours, cooled, and stirred with 250 ml. of ice water. The ether solution is separated, dried, and evaporated under reduced pressure to give a residue of crude 2-[α-(o-chlorobenzimidoyl)benzyl]-pyridine. For purification the product can be dissolved in ether, the solution chromatographed on alumina and the solid fractions recovered from the eluates; recrystallized from methanol, M.P. 86–88° C.

A solution of 15.3 g. of diethylamine in 50 ml. of anhydrous ether is added to a solution of 49 g. of 23.7% n-butyllithium (in heptane) in 75 ml. of anhydrous ether. The mixture is stirred for 30 minutes and then a solution of 31.8 g. of 2-benzylpyridine in 50 ml. of ether is added with external cooling to maintain the temperature at about 25° C. Thirty minutes later, 32.7 g. of o-bromobenzonitrile in 50 ml. of ether is added and the mixture is stirred for 2½ days and decomposed by stirring with saturated ammonium chloride solution. The ether layer is separated, dried, and evaporated to give a residue of 2-[α-(o-bromobenzimidoyl)-benzyl]pyridine; M.P. 107–109° C. after crystallization from methanol.

Example 3

A mixture of 5 g. of 2-[α-(o-methoxybenzimidoyl)-benzyl]pyridine and 25 ml. of concentrated hydrochloric acid is heated at 90–100° C. for ten minutes, cooled, diluted with 50 ml. of water and neutralized with 50% sodium hydroxide solution. The mixture is then extracted with 50 ml. of chloroform and the chloroform extract is separated, washed with water, dried, and evaporated to give α-phenyl-α-(2-pyridyl)-2-methoxyacetophenone; M.P. 104–109° C. following crystallization from methanol.

The starting material is obtained as follows. 23 g. of 2-benzylpyridine is added to a solution of phenyllithium (prepared from 2.1 g. of lithium and 23 g. of bromobenzene in 100 ml. of ether) and the mixture is heated under reflux for one-half hour. A solution of 16 g. of o-methoxybenzonitrile in 100 ml. of ether is added and the mixture is heated under reflux for three more hours, cooled, and stirred with 250 ml. of ice water. The ether solution is separated, dried, and evaporated under reduced pressure to give a residue of crude 2-[α-(o-methoxybenzimidoyl)-benzyl]pyridine. For purification the product can be dissolved in ether, the solution chromatographed on alumina and the solid fractions recovered from the eluates; recrystallized from methanol, M.P. 75–79° C.

Example 4

A mixture of 16 g. of 2-[α-(o-methylthiobenzimidoyl)-benzyl]pyridine and 50 ml. of concentrated hydrochloric acid is heated at 90–100° C. for 15 minutes, cooled, diluted with water, neutralized with 40% sodium hydroxide solution, and extracted with chloroform. The chloroform extract is washed with water and with saturated sodium chloride solution, dried over magnesium sulfate, filtered, and evaporated under reduced pressure to give α-phenyl-α-(2-pyridyl)-2-(methylthio)-acetophenone; M.P. 155–157° C. following trituration with hot methanol.

The starting material is obtained as follows. 23 g. of 2-benzylpyridine is added to a solution of phenyllithium (prepared from 2.1 g. of lithium and 23 g. of bromobenzene in 100 ml. of ether) and the mixture is heated under reflux for one-half hour. A solution of 18 g. of o-methylthiobenzonitrile in 100 ml. of ether is added and the mixture is heated under reflux for 3 more hours, cooled, and stirred with 250 ml. of ice water. The insoluble 2-[α-(o-methylthiobenzimidoyl)benzylpyridine which separates is collected on a filter; M.P. 163–165° C. following crystallization from methanol.

Eample 5

A mixture of 27 g. of 2-[α-(1-naphthimidoyl)benzyl]-pyridine, 100 ml. of concentrated hydrochloric acid and 50 ml. of ethanol is heated at 90–100° C. for three hours. The ethanol is removed by distillation under reduced pressure and the remaining aqueous mixture is diluted with ice water and made basic with 50% sodium hydroxide solution. The mixture is extracted with chloroform and the chloroform extract is separated, washed with water, dried, and concentrated to give crude α-phenyl-α-(2-pyridyl)-1-acetonaphthone; M.P. 129–132° C. following crystallization from ethanol. This compound can also be named as 1-naphthyl α-(2-pyridyl)benzyl ketone.

A mixture of 10 g. of 2-[α-(1-naphthimidoyl)benzyl]-pyridine, 100 ml. of ethanol, and 20 ml. of 50% sodium hydroxide solution is stirred at 40° C. for 24 hours. Most of the ethanol is removed by distillation under reduced pressure below 35° C. The remaining mixture is dilluted with ice water, neutralized with dilute hydrochloric acid and extracted with chloroform. The chloroform extract is separated, washed with water, dried, and concentrated to give crude α-phenyl-α-(2-pyridyl)-1-acetonaphthone; M.P. 129–132° C. following crystallization from ethanol.

The starting material is obtained as follows. A solution of 83 g. of 2-benzylpyridine in 150 ml. of ether is added slowly to a solution of phenyllithium (prepared from 7.5 g. of lithium and 85 g. of bromobenzene in 500 ml. of ether) and the mixture is stirred for one hour after the addition is complete. A solution of 75 g. of 1-naphthonitrile in 200 ml. of ether is added and the mixture is heated under reflux for 12 hours, cooled and stirred with saturated ammonium chloride solution. The ether layer is separated, combined with an ether extract of the aqueous layer, washed with saturated sodium chloride solution, dried, and concentrated to give a residue of crude 2-[α-(1-naphthimidoyl)benzyl]pyridine; M.P. 132–135° C. following crystallization from methanol-benzene.

Example 6

A mixture of 3.0 g. of 2-[α-(2,4-dichlorobenzimidoyl)-benzyl]pyridine and 30 ml. of 6 N sulfuric acid is heated under reflux with stirring for 15 minutes. The mixture is cooled and the insoluble sulfate salt of α-phenyl-α-(2-pyridyl)-2,4-dichloroacetophenone is collected on a filter; M.P. 184–186° C. following crystallization from methanolether. The free base is obtained by stirring the sulfate salt with 5% sodium hydroxide solution and extracting with ether.

The starting material is obtained as follows. A solution of 23 g. of 2-benzylpyridine in 60 ml. of ether is added to a solution of phenyllithium (prepared from 2.1 g. of lithium and 23 g. of bromobenzene in 100 ml. of ether) and the mixture is heated under reflux for 50 minutes and then treated with a solution of 20 g. of 2,4-dichlorobenzonitrile in 100 ml. of tetrahydrofuran-ether. Heating under reflux is continued for five more hours and then 250 ml. of ice water is added and the ether phase is separated, washed with saturated sodium chloride solution, dried and evaporated under reduced pressure to give a residue of crude 2-[α-(2,4-dichlorobenzimidoyl)benzyl]-pyridine. For purification it is dissolved in ether, the solution chromatographed over alumina, and the recovered product crystallized from methanol; M.P. 114–117° C.

Example 7

By the procedures of the foregoing examples, the following additional compounds are obtained by the reaction of the indicated imine compound with an acidic reagent. For purification, the free bases are crystallized from methanol.

From 2-[α-(o-isopropylbenzimidoyl)benzyl]pyridine, α-phenyl-α-(2-pyridyl)-2-isopropylacetophenone; M.P. 134–140° C.

From 2-[α-(o-fluorobenzimidoyl)benzyl]pyridine, α-phenyl-α-(2-pyridyl)-2-fluoroacetophenone; M.P. 114–121° C.

From 2-[α-(o-trifluoromethylbenzimidoyl)benzyl]pyridine, α-phenyl-α-(2-pyridyl)-2-trifluoromethylacetophenone; M.P. 127–134° C.

From 2-[α-(2,3-dichlorobenzimidoyl)benzyl]pyridine, α-phenyl-α-(2-pyridyl)-2,3-dichloroacetophenone; M.P. 127–128° C.

From 2-[α-(2,6-dichlorobenzimidoyl)benzyl]pyridine, α-phenyl-α-(2-pyridyl)-2,6-dichloroacetophenone; M.P. 148–151° C.

From 2-[α-(2,4-dimethylbenzimidoyl)benzyl]pyridine, α-phenyl-α-(2-pyridyl)-2,4-dimethylacetophenone; the sulfate salt melts at 193–195° C.

From 2-[α-(2,6-dimethylbenzimidoyl)benzyl]pyridine, α-phenyl-α-(2-pyridyl)-2,6-dimethylacetophenone; M.P. 148–152° C.

The 2-[α-(ortho-substituted benzimidoyl)benzyl]pyridine compounds employed as starting materials are obtained by the reaction of the correspondingly substituted benzonitrile compounds with the lithium derivative of 2-benzylpyridine under anhydrous condiitons followed by mild hydrolysis of the reaction mixture with water or ammonium chloride solution, as illustrated in greater detail in the preceding examples.

*Example 8*

A solution of 47 g. of 2-benzylpyridine in 100 ml. of anhydrous ether is added to a solution of phenyllithium (prepared from 4.2 g. of lithium and 47 g. of bromobenzene in 300 ml. of ether) and the mixture is stirred for one hour. The resulting solution containing the lithium derivative of 2-benzylpyridine is treated with 40 g. of methyl o-methylbenzoate in 100 ml. of anhydride ether and the mixture is heated under reflux for 12 hours, cooled and stirred with saturated ammonium chloride solution. The ether phase is separated, washed, dried, and evaporated to give a residue of α-phenyl-α-(2-pyridyl)-2-methylacetophenone; M.P. 145–149° C. following crystallization from methanol.

The same product is obtained by substituting 41 g. of o-methylbenzoyl chloride for the methyl o-methylbenzoate in the foregoing procedure.

We claim:
1. A compound of the formula

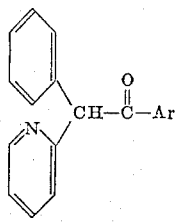

where Ar is a member of the class consisting of o-methylphenyl, o-ethylphenyl, o-isopropylphenyl, o-chlorophenyl, o-bromophenyl, o-fluorophenyl, o-methoxyphenyl, o-methylthiophenyl, o-trifluoromethylphenyl, 1-naphthyl, 2,3 - dichlorophenyl, 2,4 - dichlorophenyl, 2,6 - dichlorophenyl, 2,4-dimethylphenyl and 2,6-dimethylphenyl.
2. α-Phenyl-α-(2-pyridyl)-2-methylacetophenone.
3. α-Phenyl-α-(2-pyridyl)-2-chloroacetophenone.
4. α-Phenyl-α-(2-pyridyl)-2-bromoacetophenone.
5. α-Phenyl-α-(2-pyridyl)-2,4-dichloroacetophenone.

6. Process for the production of compounds of the formula

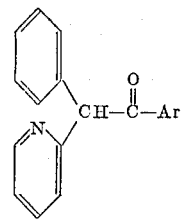

which comprises reacting a compound of the formula

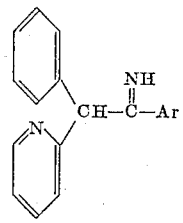

with a member of the class consisting of strong acids and strong bases in a hydroxylic medium; where Ar is a member of the class consisting of o-methylphenyl, o-ethylphenyl, o-isopropylphenyl, o-chlorophenyl, o-bromophenyl, o-fluorophenyl, o-methoxyphenyl, o-methylthiophenyl, o-trifluoromethylphenyl, 1-naphthyl, 2,3-dichlorophenyl, 2,4-dichlorophenyl, 2,6-dichlorophenyl, 2,4-dimethylphenyl and 2,6-dimethylphenyl.

7. Process according to claim 6 wherein the reaction is carried out with a strong acid and the strong acid is a mineral acid.

8. Process according to claim 6 wherein the hydroxylic medium is water.

9. Process according to claim 6 wherein the reaction is carried out with a strong acid and the product is isolated as the free base following treatment with a base.

References Cited in the file of this patent
UNITED STATES PATENTS
2,482,521    Smith _____ Sept. 20, 1949
OTHER REFERENCES Tilford et al.: JACS, vol. 76, p. 2439 (1954).
Beckett et al.: J. Pharm. and Pharmacol., vol. 7, pp. 717–29 (1955).
Levine et al.: "J. Org. Chem." vol. 25, pp. 530–7 (1960).